United States Patent
Suri

(10) Patent No.: US 6,963,579 B2
(45) Date of Patent: Nov. 8, 2005

(54) SYSTEM AND METHOD FOR BROADBAND ROAMING CONNECTIVITY USING DSL

(75) Inventor: Atul Suri, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 913 days.

(21) Appl. No.: 09/810,749

(22) Filed: Mar. 16, 2001

(65) Prior Publication Data

US 2002/0131436 A1 Sep. 19, 2002

Related U.S. Application Data

(60) Provisional application No. 60/266,409, filed on Feb. 2, 2001.

(51) Int. Cl.[7] ............................................. H04L 12/66
(52) U.S. Cl. ...................................... 370/420; 370/463
(58) Field of Search ................................ 370/401, 419, 370/420, 421, 422, 449, 452, 463, 535; 713/150, 160, 161, 168

(56) References Cited

U.S. PATENT DOCUMENTS

| | | | | | |
|---|---|---|---|---|---|
| 5,991,292 | A | * | 11/1999 | Focsaneanu et al. | 370/352 |
| 6,128,300 | A | * | 10/2000 | Horton | 370/395.65 |
| 6,137,839 | A | * | 10/2000 | Mannering et al. | 375/260 |
| 6,363,079 | B1 | * | 3/2002 | Barzegar et al. | 370/465 |
| 6,597,689 | B1 | * | 7/2003 | Chiu et al. | 370/354 |
| 6,667,971 | B1 | * | 12/2003 | Modarressi et al. | 370/352 |
| 6,781,981 | B1 | * | 8/2004 | Kimbrough | 370/352 |

* cited by examiner

Primary Examiner—Kwang Bin Yao

(57) ABSTRACT

A broadband communication appliance allows multiple, simultaneous access by a multiplicity of users to a high-speed broadband wide area network connection. Multiple data lines, facilitated within a user premises are aggregated, by high-density connectors, into a system that includes multiple DSL modems, coupled to a wide area network through a high-speed network interface device. Data service requests are detected and particular ones of the DSL modems are assigned to service a particular data line. Bi-directional communication, using the modem bank, is concentrated through the high-speed network interface device, such that multiple users are able to obtain broadband connectivity, using DSL data rates. Users are authenticated as DSL subscribers, by maintaining their subscription profile information on an authentication server. The system retrieves a subscriber's profile information from their local authentication server, and maintains it locally, such that a user is able to effect DSL communication in accordance with DSL service, as obtained from their own service provider. A user is able to therefore "roam" while maintaining DSL connectivity.

14 Claims, 7 Drawing Sheets

SYSTEM AND METHOD FOR BROADBAND ROAMING CONNECTIVITY USING DSL

CROSS-REFERENCE TO RELATED APPLICATIONS

This application claims the benefit of provisional application No. 60/266,409, filed Feb. 2, 2001.

The present application is related to, and claims priority from, Provisional Patent Application entitled: PORTABLE DSL SYSTEM, filed Feb. 2, 2001, commonly owned with the present application, the entire contents of which are expressly incorporated by reference.

FIELD OF THE INVENTION

The present invention is directed generally to systems and methods for DSL data communication and, more particularly, to a portable DSL system which accommodates DSL roaming.

BACKGROUND OF THE INVENTION

Over the past several years, there has been an almost exponential growth in the use of the World Wide Web, also known as the Internet, particularly with regard to its ability to provide multimedia information to a user. However, in order to make the best and most efficient use of the information delivery capabilities of the Internet, a user needs to be coupled to the World Wide Web through a communication interface that ensures high-speed broadband content delivery.

Pertinent such communication interfaces include coupling to the Internet using digital subscriber line (DSL) technology, which is able to afford a high-speed data communication connection to a user. DSL technology was initially conceived as a point-to-point communication methodology, with each particular user being required to subscribe to DSL service, through a local DSL service provider. DSL is one of the most common high-speed connection methodologies, although it is limited in certain respects; a user being required to have a downstream premises no more than 18,000 feet (approximately 3 miles) from a system head-end commonly located in a TELCO central office.

Although this line-length constraint necessarily limits the scope and scale of DSL usage, effectively precluding large rural areas from participating in DSL communications, a more significant limitation on DSL connectivity is its conventional requirement that the user access the system from their home premises location. If a user were required to gain Internet access from anywhere other than their home premise, they would be required to make a connection with either a dial-up modem or by utilizing a DSL connection that would be hosted by whatever premises they were visiting. Needless to say, the user would need permission and authorization to use the third-party DSL connection, as well as have the capability to bi-directionally communicate with the Internet in accordance with whatever subscription profile information was recorded against that third-party DSL point.

Additionally, most users that would wish to access the Internet at multiple times per day and from multiple diverse locations, would need to populate their portable computer systems with a number of different network interface devices; a DSL modem for Internet communication while at their home premises location and/or a dial-up modem for effecting Internet communication when away from their home premises location.

It is also pertinent that in today's business environment, a large number of business travelers will be attempting to access the Internet, for various reasons, during the course of a business day. Concentrations of business travelers can be found at hotels, airports, convention centers, and the like, all attempting to obtain information from the Internet in the most efficient manner possible. It is axiomatic that facilities of this type (i.e., hotels, transportation hubs, convention centers, etc.) have a large number of telephone access ports, typically configured as RJ-11 plugs which could serve as an ideal communication medium for DSL connectivity, if DSL service allowed a DSL subscriber to "roam". A user would then only need to subscribe to a DSL service in order to avail themselves of DSL data communication rates by merely "plugging in" to a premises telephone jack and utilizing their personal DSL network interface device.

Implementing a system with such a capability within a remote premises, would allow that facility to offer broadband network connectivity to the premises population. Further, the concept of "roaming", in the DSL context, would allow a DSL user to connect even though the user is no longer at their home premises. A DSL roaming connection, therefore, would be defined as any connection made by a user, as the user, at any point away from their home premises. A connection made by the user, as the user, is an important concept, since it allows a user to function as themselves in a DSL environment, and not be limited to functioning in a "guest" capacity.

Such a system, so implemented, would be able to offer each individual service subscriber a DSL connection to the network in accordance with that particular user's subscription profile record, as it was established by that user's DSL service provider. Additionally, a user's bandwidth utilization would be directly billable to the user, through the user's service provider, in accordance with the service provider's established "roaming rates". Thus, a user would no longer be limited to the point-to-point connection methodology of present DSL service, but would be able to avail themselves of high-speed broadband information communication from any third-party premises implementing a broadband appliance that enables DSL roaming.

SUMMARY OF THE INVENTION

In order to achieve the objects and advantages of the invention, a self-contained data communication system provides simultaneous broadband connectivity to multiple access locations at DSL rates. The system is configured for installation in a user premises having multiple subscriber access location ports, and comprises a multiplicity of subscriber data signal lines, each subscriber line coupled between the system and a subscriber port of a user premises, and a plurality of line cards disposed within a housing. Each line card further includes a DSL modem bank, detector circuitry coupled between the modem bank and the multiplicity of subscriber signal lines, the detector circuitry polling the signal lines to thereby detect a request for data service and a control processor. The processor assigns a particular one of the DSL modems comprising the modem bank to a subscriber upon detection of a request for data service on a particular subscriber signal line. A WAN/trunk card, disposed within the housing is coupled to the plurality of line cards by a signal bus, the WAN/trunk card is connected between each modem bank and a wide area network so as to effect bi-directional broadband communication therebetween.

In one aspect of the invention, each line card includes sixteen DSL modems, each line card further configured to couple to 128 subscriber signal lines through high density connectors, each line card controlling access to particular ones of the modems by all 128 subscriber signal lines. Each housing is further configured to include four line cards, the system being configured to provide simultaneous access by sixty four DSL modems to a wide area network, each housing defined system providing broadband connectivity to 512 subscriber signal lines.

In a further aspect of the invention, the system includes in-band authentication means for communicating with a remote record storage facility and a memory storage area configured to receive and maintain subscriber record information provided by the remote record storage facility. Access to a broadband connection to the wide area network is granted in accordance with subscriber record information maintained in the memory storage area. In particular, the remote record storage facility comprises a plurality of authentication servers, each authentication server disposed within and servicing a particular geographic area, each authentication server receiving individual subscriber profile information from DSL service providers within the geographic region and storing said individual subscriber profile information in a respective database. Each subscriber receives a unique subscriber identification indicia, the subscriber identification indicia including an address identifier portion indicating a subscriber's home authentication server. The system interrogates a subscriber's home authentication server in accordance with the subscriber identification indicia, the authentication server returning an authorized subscriber's individual subscriber profile information, the system granting broadband access to the wide area network to the subscriber solely in accordance with the individual subscriber profile information. The system stores individual subscriber profile information in the memory storage area, the system granting a subscriber broadband access in accordance with stored individual subscriber profile information upon second and subsequent connection sessions.

In a further aspect, the WAN/trunk card comprises a WAN connection portion and a control portion, the control portion further including a control processor, and out-of-band communication means, the out-of-band communication means bi-directionally communicating with a network management system. The control portion is functionally bifurcated from the WAN portion, such that the WAN portion may be implemented in accordance with a multiplicity of communication interface methodologies interchangeably.

In particular, a method for providing simultaneous broadband connectivity to multiple access locations implemented in a premises remote from a user's home service location comprises aggregating a multiplicity of subscriber data lines, polling the data lines so as to detect a request for data service on particular ones thereof, servicing multiple simultaneous data service requests through a plurality of DSL modems, and concentrating multiple DSL communication sessions through a wide area network interface so as to facilitate multiple simultaneous communication sessions between a wide area network and multiple users using broadband access from a premises remote from and unrelated to a user's home location.

A specific aspect of the novel method includes interrogating a user for an identification indicia upon receipt of a data service request, establishing an in-band communication channel with a remote record storage facility, receiving subscriber record information, associated with the user, provided by the remote record storage facility, and granting access to a broadband connection to the wide area network in accordance with the subscriber record information.

In accordance with the invention, a method for authenticating simultaneous broadband connectivity requests by a plurality of users coupled to multiple access locations implemented in a premises remote from a user's home service location includes having the user's home service provider assign each subscribing user a unique identification indicia and associating the identification indicia with the user's subscription profile information. The user's subscription profile information is forwarded by the user's service provider to a database hosted by one of a plurality of authentication server systems, each authentication server disposed within and servicing a particular geographic area. Each authentication server receives individual subscription profile information from DSL service providers within the geographic region so as to maintain a profile record of all subscribers within the region.

Upon receipt of a data service request by a user, the user is interrogated by the system to establish their authorization to use broadband access. A user's identification indicia is requested upon receipt of a data service request, and a communication channel with the user's authentication server is established. The system receives a user's subscription profile information from the authentication server, and grants access to a broadband connection to a wide area network in accordance with the user's subscription profile information.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE INVENTION

Having summarized the principles of the present inventions, the structure, arrangement and use of the invention will be described in connection with certain exemplary embodiments illustrated herein. While the invention will be described in connection with the embodiments shown in the illustration, there is no intent to limit the invention to the embodiment or embodiments disclosed herein. In contrast, the invention is intended to cover all alternatives, modifications and equivalents which are included within the spirit and scope of the invention as defined by the appended claims.

Figure 7:
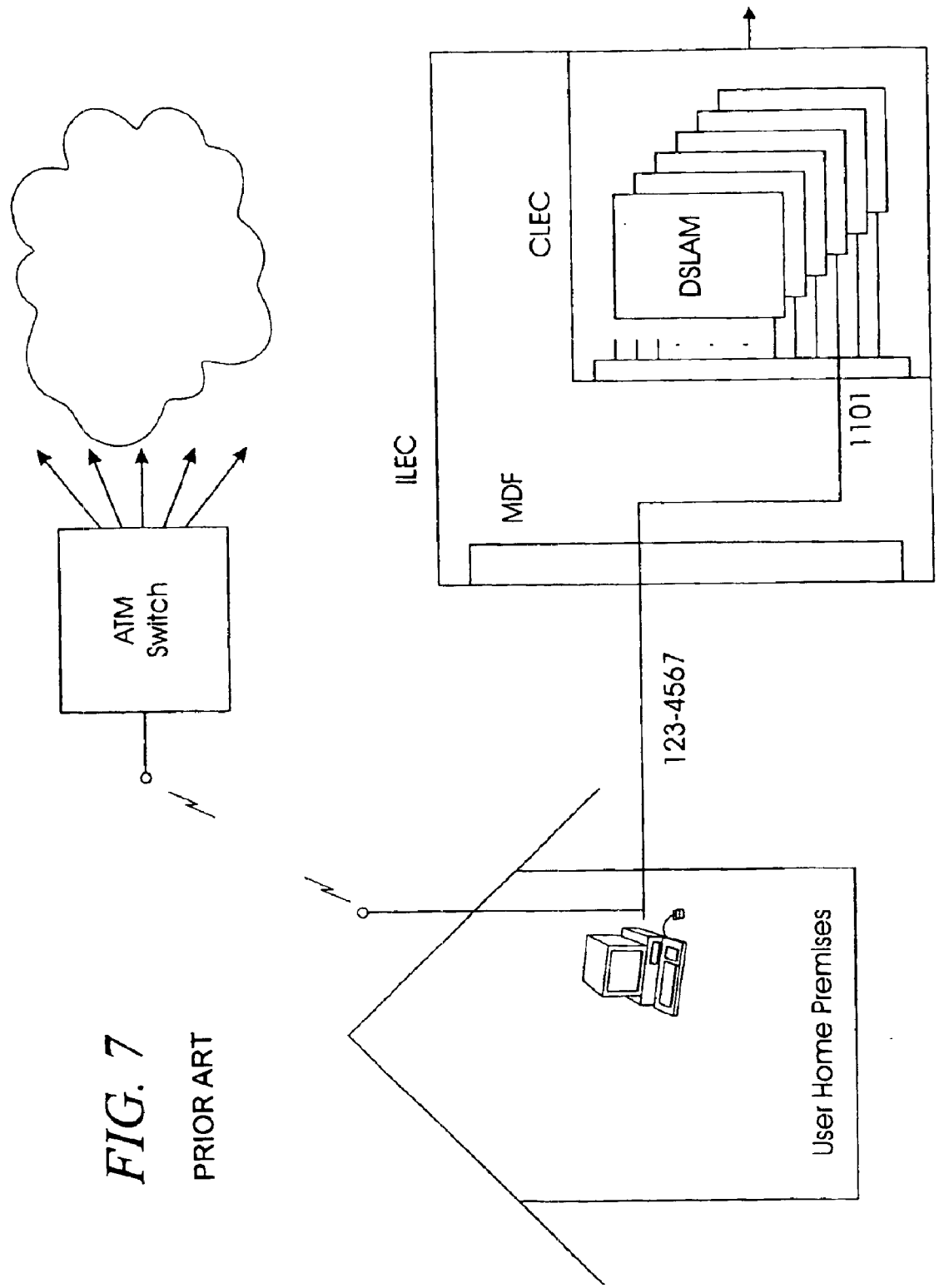
FIG. 7 is a simplified schematic diagram of a conventional DSL implementation scheme, illustrating the point-to-point nature of contemporary systems.

Before discussing the implementation of the present invention, it would be worthwhile to review the present state of DSL technology implementation, at least as it relates to how DSL is currently facilitated. Having recourse to the simplified illustration of FIG. 7, a DSL user is conventionally coupled to an incumbent local exchange company (termed an ILEC) which is the established local telephone company that provides virtually all of the local telephone service in its region (e.g., Ameritech, Pacific Bell, Bell Atlantic, BellSouth, etc.). The connection is over the ILEC provided telephone service wires and is directed to the ILEC's main distribution frame (the MDF), located in the subscriber's central office, whence connection to the "rest of the world" is made.

DSL service is provided through a bank of digital subscriber line access multiplexers (DSLAMs) which separate voice-frequency signals from high-speed data traffic and which control and route digital subscriber line (xDSL) traffic between the subscriber's end-user equipment (router, modem, or network interface card [NIC]) and a network service provider's network. DSLAMS are facilitated into an ILEC's central office by a competitive local exchange carrier (termed a CLEC) which refers to a new local telephone company, such as Covad, Winstar, TCG, ICG, etc., that is entering the local market in order to compete with the incumbent local telephone company. A user's subscription to a DSL service provider, such as DSLNet, for example, is effectively serviced by CLEC equipment, with DSLNet contracting for access with Covad, for example.

Conventionally, each ILEC customer that contracts for DSL service is "hardwired" to a respective individual DSLAM port belonging to the CLEC. A wire connection is made between user number 123-4567's port on the MDF and a dedicated input port (number 1101, for example) of the CLEC DSLAM bank; in effect, a point to point connection between a single subscriber line and a single DSLAM. The DSLAM then establishes communication with the requisite network service provider (DSLNet in the example) in accordance with a hard profile, established by the CLEC for the equipment and the service provider for the scope of service access. It is also evident from the illustration of FIG. 7, that a subscriber need not be connected to a central office by TELCO wiring. Wireless systems allow a user to broadcast information over a wireless uplink to a receiver station coupled to an ATM switch.

The invention is characterized as a portable DSL system, suitably comprising a Broadband Communications Appliance (BCA) which enables the functionality of DSL roaming, whereby the user is able to use an existing DSL modem for multiple access locations that are enabled within a broadband infrastructure. Notably, this is a paradigm shift in the DSL industry, which conceptualized DSL to be a point-to-point connection only. The BCA unit can be characterized as an edge network device that communicates with multiple end-user DSL modems, performs authentication operations in order to determine whether a data user is a valid user, aggregates traffic from multiple users, and provides a high-speed uplink to a network core for management services, authentication services, and the like. In particular, the system is able to provide direct T1 (T3, wireless, or other interface protocol) coupling to an ILEC, terminating in an ATM switch (the connection may be ATM or Frame Relay mapped) so as to completely avoid remove the system dependency on a CLEC, and its associated point-to-point DSLAM banks.

The particular operational features of a BCA unit include those features directed to router functions, modem functions and LAN functions. The purpose of router functionality is to provide efficient aggregation of data traffic and further provide maximum flexibility in terms of port density and support for a rich IP feature set, such as IPSEC, DHCP and NAT. As will be understood by those having skill in the art, Dynamic Host Configuration Protocol (DHCP) and Network Address Translation (NAT) capabilities allow a system to share a single DSL connection across a network. DHCP assigns to each network client an unregistered IP address that is not visible on the Internet. NAT routes packets from the single registered Internet address to all local area network clients. Modem functionality is implemented by a V.90 compatible modem which provides out-of-band access to the Point of Presence (POP, the local telephone exchange from which service is received) in the event of LAN circuit failure. This also allows a Network Operation Center (NOC) to monitor and diagnose POP installed devices in the field.

WAN functionality provides a WAN connection to the backbone NOC. Backbone connection speeds will tend to vary with POP size and as the density and penetration of users increases. WAN connection solutions include Frame Relay over T1, point-to-point T1 circuits, T3 circuits and the like. WAN functionality is modular in implementation, such that a system's service type can easily be changed by merely swapping functional modules. Support is also included for multiple WAN interface options, including two or four T1/E1 ports and would also be compatible with wireless backhauls. Multi-link point-to-point protocol (PPP) allows these links to be bonded together for load sharing and higher speed connectivity.

With regard to detection functionality, the BCA unit is capable of monitoring all of the subscriber data lines coupled thereto and is further capable of detecting the need for data service associated with each data line. In accordance with the invention, detection circuitry is coupled to each premises data line and continuously interrogates the respective data line for a request for service. The particular data detection method may be any one of several methods that allow the system to determine whether a subscriber should be connected to the DSL modem for data transfer. The detector may monitor line current, line voltage, or electrical tones generated by a subscriber modem. The particular detection methodology chosen is not a material feature of the present invention. All that is required is that there be some method of detecting the need for data service associated with each data line. Once a data service request is detected, the detection circuitry "sets" a logic element associated with the respective data line. The logic element might suitably comprise any form of state machine such as a latch, flip-flop, or the like, which can be triggered to a state (i.e., a "one") indicating a service request on the line. As will be described in detail below, a microprocessor polls the logic elements looking for a "set" state. Any "set" lines are then serviced, line status is acknowledged, and the state machine (the logic element) is "reset".

Various BCA units can be installed at various locations having high density communication traffic, such as airports, hotels, convention centers and the like. Whenever a DSL roam subscriber tries to connect to a BCA network, in order to gain broadband Internet access, he or she needs to be authenticated, so as to ascertain their validity as a paid subscriber and to allow the system to retrieve their particular service profile. Service profile retrieval is particularly important, since a subscriber's service profile is organized to contain user specific information, such as maximum broadband speed contracted for, a user's unique mobile identification number, the user's original service provider identification, and the like.

In order to implement the DSL roam functionality, the system uses the Home Location Register (HLR) and Visitor Location Register (VLR) methodology made popular by and conventionally used in the wireless communication industry (especially GSM). Four, or more, Broadband Authentication Servers (BAS) serving the four main regions of the United States, host the authentication data bases utilized by the system. Each of these BAS systems maintain a list of the service profiles of the DSL roam subscribers contained in the HLR of their respective regions. A Roaming DSL subscriber, signing up with a service provider in San Diego, for example, will necessarily have an entry in the corresponding HLR table of the BAS which services the San Diego area. When that same subscriber travels to San Francisco, for example, and tries to access the Internet through a San Francisco area service provider's BCA, the BCA queries the BAS that would contain the subscriber profile within its HLR and retrieves the profile. Since each subscriber modem has a unique ID that relates to a subscriber's home service, the BCA is able to easily determine the subscriber's corresponding BAS. The retrieved user service profile is temporarily stored at the San Francisco area BCA's VLR, or visitor location register. The BCAs, in general, cache the VLR entries for a certain period of time, e.g., for a few days, in order to minimize or avoid the BCA-to-BAS authentication sequencing operations, each time a particular visiting user dials in to the service. So long as the BCA has an entry for the user in its VLR tables, the local BCA is able to perform authentication locally. In this regard, it should be noted that a first-time connection delay could be as long as approximately one minute, since it would necessarily involve an initial exchange-of-message procedure with the area BAS. Subsequent connection set up times are substantially faster, since no connection or message exchange with the BAS is required.

Specifically, as a subscriber registers with a service provider, each subscriber modem is assigned a unique device identification code by the service provider. The unique device ID is programmed into the non-volatile memory of the modem via an open standard or protocol, and is accessible to a BCA query in order to identify the modem to the system. A subscriber's service provider also enters the subscriber profile in the corresponding BAS which serves the subscriber's particular geographic region, such that each subscriber's profile is available to queries to their respective BAS. Necessarily, each BCA is provided with the Internet Protocol (IP) address of all the geographically mapped BASs so that it is able initiate a request for authentication with any BAS comprising the network.

In one particular aspect, the Broadband Communications Appliance system can be characterized as a concentrator device which includes a multiplicity of input ports, wherein one input port is wired to each of the subscriber loop telephone lines (typically Unshielded Twisted Pair, or UTP wires), up to the input capacity of the particular unit, of the facility in which the system is installed. For example, 512 UTP subscriber loops are aggregated into an exemplary system through a high-density connector, enabling system access to each and every RJ-11 port within the facility, up to 512 ports (for any one particular system). The system detects the need for any single port utilization, and once a data transfer request is detected, the system identifies the user and initiates an authentication request from a BAS. Once authentication is received for that user, the system provides a data path to a set, or bank, of DSL Modems which provide the actual communication functionality. DSL Modems are provided in accordance with a statistical ratio, such that 512 individual inputs are coupled through 64 DSL Modems, for example. Axiomatically, not all of the 512 inputs will be active at any one time. Accordingly, a statistical analysis is performed on the facility in order to determine a generalized average port use. A corresponding number of DSL modems are then provided to the system.

It will be understood by those having skill in the art, that in some aspects of the implementation, the Broadband Communications Appliance resembles a DSLAM. A Digital Subscriber Line Access Multiplexer (DSLAM) delivers high-speed data transmission over existing copper telephone lines. A DSLAM separates the voice-frequency signals from high-speed data traffic and controls and routes DSL traffic between the subscribing end-user equipment (router, modem, or network interface card (NIC)) and the network service provider's network.

Figure 1A:
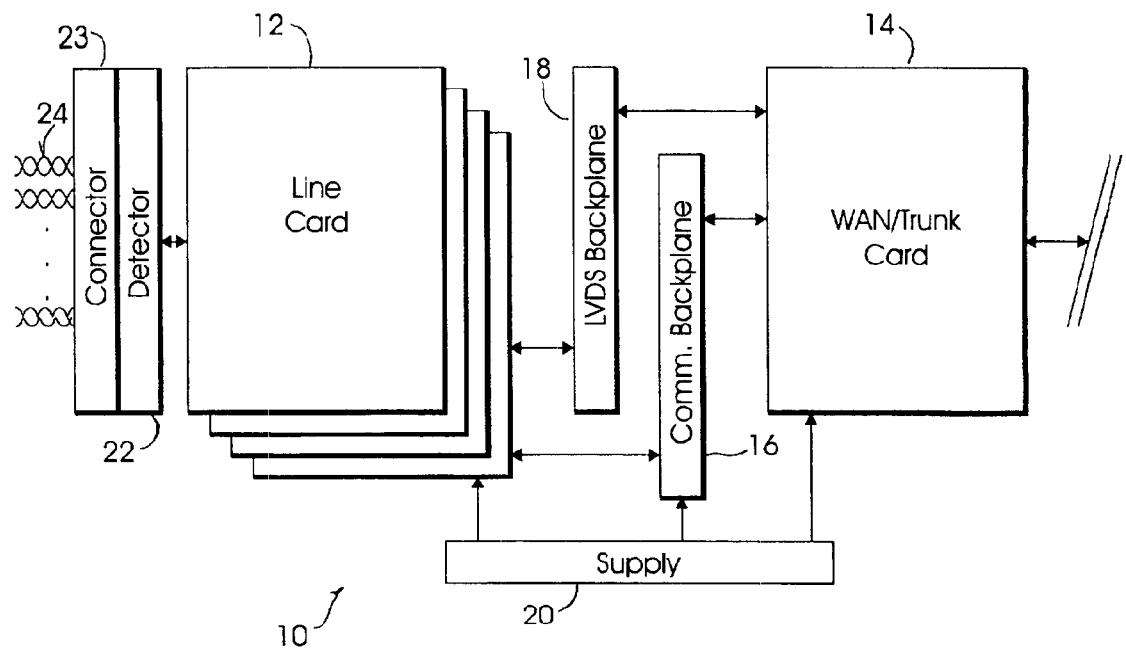
FIGS. 1a and 1b are simplified, semi-schematic block level diagrams of an exemplary system implementation suitable for practice of principles of the invention.
Figure 1B:
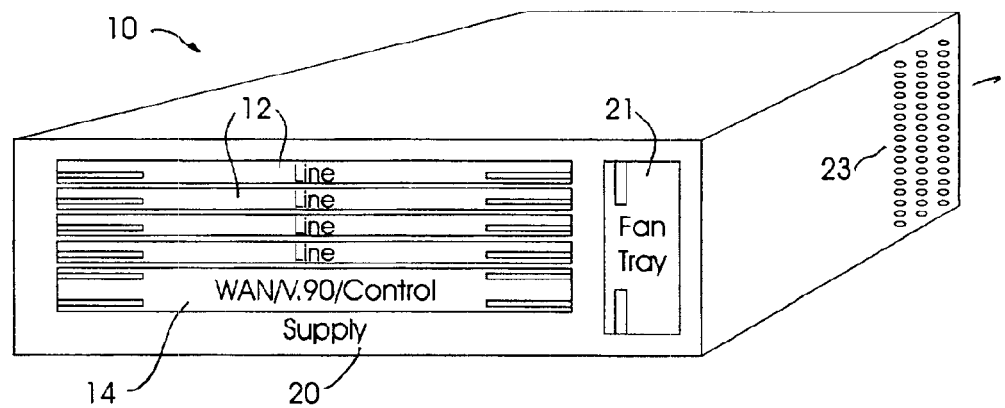

Turning now to FIGS. 1a and 1b, an exemplary embodiment of a portable DSL system, indicated generally at 10, is illustrated in simplified, semi-schematic block diagram form in FIG. 1a, and in a simplified perspective exterior view in FIG. 1b. Briefly, the system might be implemented as a rack-mountable unit that is approximately 7" tall by 12" deep and conforms to a standard 19" standard telecommunication equipment mounting rack. The basic card cage is implemented to include four line cards 12 coupled to a control/WAN/trunk card 14 through a communication control backplane 16 and a Low Voltage Differential Signaling (LVDS) data backplane 18. Low Voltage Differential Signaling (LVDS) is a relatively recent technology which supports a low voltage differential signal of 330 mV. and fast transition times. LVDS technology allows the system to address high data rates ranging from approximately 100 Mbps. to greater than 1 Gbps. Additionally, the low voltage swings attendant LVDS technology allows the system to minimize power dissipation while providing the benefits of differential transmission. A power supply system 20 and a cooling system (not shown), such as a fan, are also included in the exemplary DSL system 10 of FIGS. 1a and 1b.

In accordance with the invention, the line cards are disposed within the card cage in a horizontal orientation, resulting in a pleasing appearance and low profile implementation for the system. Due to the horizontal implementation of the system cards, thermal management may be done quite creatively. Cooling fans are disposed in a vertical fan tray 21 which is installed within the cage, to one side of the card stack. The fans draw cooling air in from vents 23 formed in the unit's side, direct the cooling air across the cards, and exhaust the air on the cage side opposite the intake.

In further accordance with the invention, the portable DSL system 10 communicates with a plurality of subscribers over unshielded twisted pair (UTP) wiring that is a conventional part of the physical communication plant of a particular facility or user premises. Multiple UTP wires are coupled to the system 10 through high density connectors 22 that are able to concentrate and aggregate a large number of subscriber lines 24. As will be described in greater detail below, one embodiment of the system incorporates four line cards 12, each of which is capable of coupling to 128 subscriber loops. Accordingly, the four line cards are able to communicate with 512 subscriber loops through corresponding line interface circuitry. It should be noted that subscriber lines need not be defined as UTP copper wires. Indeed any category of user premises wiring, whether copper, fiber, shielded, or unshielded, may be used as input subscriber lines. UTP premises wiring is described herein only because it is the most common legacy premises wiring and the most often encountered, and not because of any technical requirement.

It is a characteristic feature of the portable DSL system of the invention, that it is modular in nature, thereby allowing the system to be coupled from approximately 128 subscriber loops to any number of subscriber loops, by merely increasing the number of modular line cards units incorporated within the system. Also, as will be described in greater detail below, the communication protocol circuitry which couples to the local service provider is also modular in nature (i.e., interchangeable), such that the system is not limited to T1 transmission, for example. With the exemplary system of FIGS. 1a and 1b hosting 512 subscriber loops, it will be evident to those having skill in the art that coupling two such systems together would allow communication with 1024 subscriber loops and multiple daisy-chain coupling allowing respective multiples of 512 subscribers to be serviced by the system.

At the other end of the communication channel, the WAN/trunk card 14 is contemplated as being implemented to incorporate two T1 line interface units, each functioning as a high-speed digital connection, capable of transmitting data at a rate of approximately 1.5 Mbps. T1 lines, also referred to as leased lines, are recognized as supporting a communication bandwidth sufficient to send and receive very large text files, graphics, audio and data base information and is currently the most heavily used high-speed connection methodology between local service area networks and a wide area network such as the Internet.

While described in terms of a T1 line interface circuit, the WAN/trunk card might just as easily be implemented as a T3 line, i.e., a high-speed connection capable of transmitting data at a rate of approximately 45 Mbps., if the portable DSL system is intended to be implemented in installations which require bandwidth suitable for full-motion real-time video transmission over a busy network. Indeed, the specific interface type (whether T1, T3, 100Base-T4, or the like) is not particularly relevant to practice of principles of the invention. All that is required is that the portable DSL system have the ability to connect to the Internet with a high-speed data communication interface. For this reason, the WAN/trunk card is bifurcated, in that WAN connection portion is provided separately from the control circuitry portion in order to accommodate interchangeability of the network connection methodology. Various interfaces are able to be supported with only a control software modification being made to the control portion of the WAN card. This feature can be understood as supporting future upgradeability to more capable interface systems as they evolve.

Digressing momentarily, the portable DSL system 10 of FIG. 1, is physically incorporated in a user premises, behind the user premises POTS splitter, such that each RJ-11 termination port in the user premises is available for physical coupling to the portable DSL unit. Each user premises is typically connected to a TELCO central office through a switch and splitter arrangement, well known to those having skill in the art. Although the system is contemplated as serving a user premise which is coupled to a conventional TELCO POP, many large user premises, such as hotels, airports and the like, are able to implement their own Point of Presence (POP) nexus (a PBX system, for example) so as to support and host a larger number of individual subscriber connections. Such POP systems typically incorporate their own splitters, and the portable DSL system in accordance with the invention is contemplated as being facilitated behind the local splitter.

Figure 2:
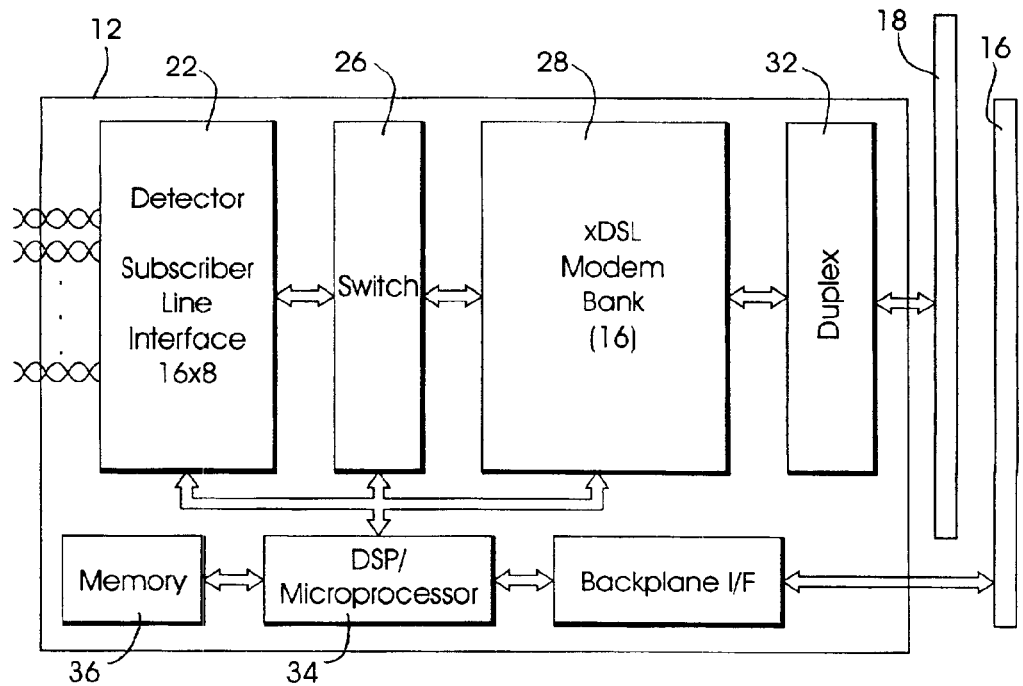
FIG. 2 is a simplified, semi-schematic block level diagram of an exemplary line card suitable for use in connection with the system of FIG. 1.

FIG. 2 is a simplified, semi-schematic block level diagram of an exemplary embodiment of a line card which will be suitable for practice of principles of the invention. The line card, indicated generally at 12, is able to service up to 128 subscriber data loops, for a total of 512 subscriber loops for the system as a whole. The 128 subscriber loops are coupled into the line card by way of high-density connectors and are coupled to detection/line interface circuitry 22 through line transformers and other conventional conditioning circuitry. Suitably, the detection circuitry incorporates 128 detectors, each comprising a logic element which detects and stores a request for data service from its corresponding subscriber loop. The logic circuitry incorporated in each detector might, for example, look for any off-hook condition of its corresponding subscriber loop, or some combination of an off-hook condition and service request sequencing signals from a modem or the like.

The line card 12 further comprises a switch matrix 26 that is suitably disposed between the detection circuitry 22 and a bank of sixteen xDSL modems 28. The xDSL modems are conventional in construction and might be any form of xDSL modem, such as manufactured by Globespan, Texas Instruments, Connexant, or other suitable manufacturer.

A duplexor 32, capable of coupling up to 32 DSL modems, is connected between the modem bank and an LVDS data backplane (18 of FIG. 1a). An exemplary duplexor of the type suitable for practice of principles of the invention might be represented by a duplexor chip or chipset manufactured and sold by PMC Sierra or an equivalent. The data generated by an xDSL modem in the modem bank 28 is sent through the duplexor 32 and over the LVDS data backplane (18 of FIG. 1) to the WAN/trunk card 14 comprising the system.

The line card 12 is operationally controlled by a DSP/microprocessor 34 which functions to poll the logic elements comprising the detection circuitry 22 in succession, in order to determine whether a subscriber loop is requesting data service and, if so, which one. The DSP/microprocessor 34 also maintains an activation table/registry of all transactions, active subscriber loop records, absence of data activity records, and modem pool assignment records in a suitable memory storage area 36, such as an SRAM, flash PROM, EEPROM, or the like. Each subscriber loop requesting service is selected by the DSP/microprocessor 34 through the corresponding Switch Matrix and further selects a corresponding DSL modem which is currently available for service. In operation, when data service is requested, a particular modem, from the modem bank 28, is selected by the DSP/microprocessor 34 to service that particular data request. The selected modem trains with the modem on the subscriber loop, as will be understood by those having skill in the art, in order to create a logical channel for that subscriber loop.

The LVDS data backplane 18 provides the connection between the line cards and the WAN/trunk card 14. The backplane is able to support data rates up to 200 Mbps. over each link from the multiple line cards in the system. The data backplane utilizes LVDS signaling implemented by the PMC Sierra chip set family, or a suitable equivalent.

A communication or control backplane 16 is used by the WAN/trunk card 14 to exchange information with the various line cards in a manner to be described in greater detail below. The communication backplane 16 is suitably implemented as an Ethernet supporting data rates of at least 1 Mbps. The communication backplane 16 functions, in combination with the WAN/trunk card 14, to provide control over the line cards for all system level configuration, health and status monitoring and other critical functions. Communication backplane 16 is coupled to each line card through a backplane interface 38, in turn coupled to the DSP/ microprocessor 34.

Figure 3:
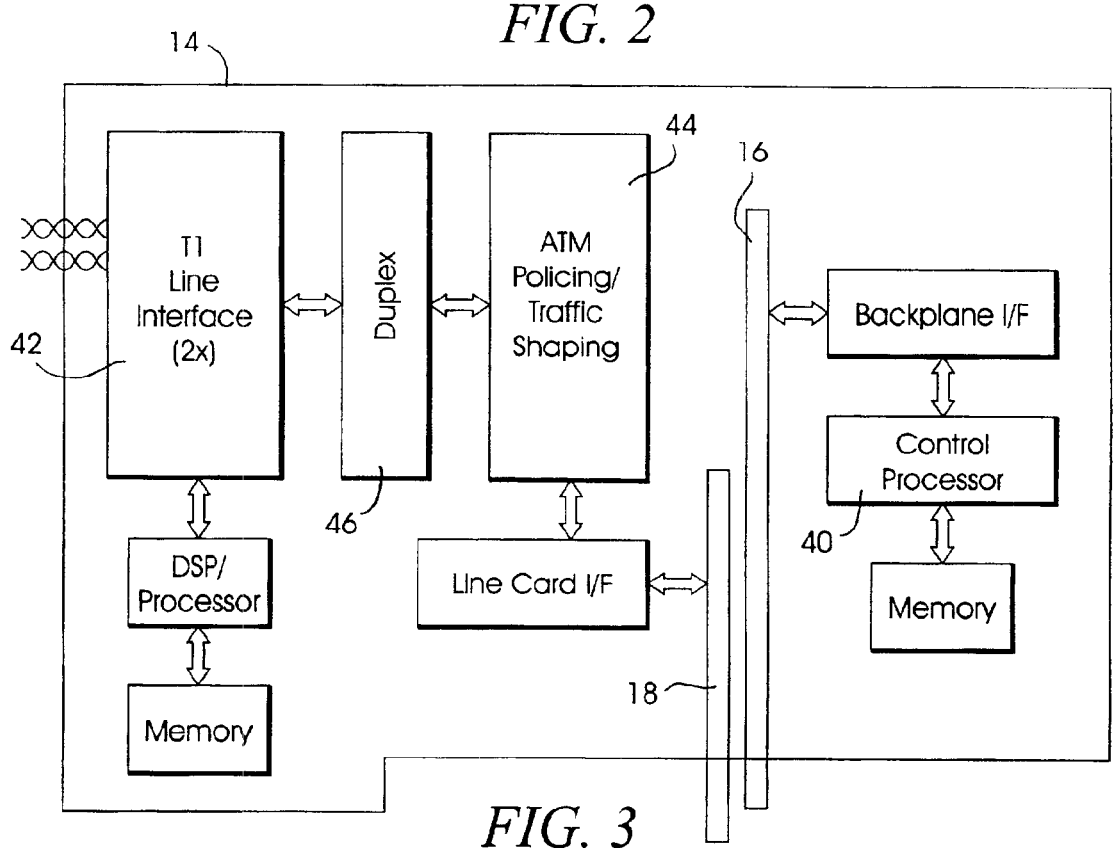
FIG. 3 is a simplified, semi-schematic block level diagram of an exemplary WAN/Trunk/Control card suitable for use in connection with the system of FIG. 1.

An exemplary embodiment of a WAN/trunk card is illustrated in the simplified, semi-schematic block level diagram of FIG. 3, and is indicated generally at 14. The WAN/trunk card 14 functions to aggregate the data traffic from a plurality of LAN cards before transferring the data to a network core via a high-speed uplink. Additionally functioning as a control card, the WAN/trunk card 14 provides for control over the line cards, through the communication backplane 16 by means of a single chip integrated microprocessor 40 exemplified by the MPC860 family of microprocessors manufactured and sold by Motorola. Microprocessor 40 suitably integrates two processing blocks; an embedded powerPC core and a communication processor module, which closely resembles the functionality of the Motorola 68xxx family of microprocessors. Further, and of particular importance to the practice of principles of the invention, the control processor 40 supports full 10 Mbps. Ethernet/IEEE802.3 functionality, as well as many other supportive protocols, with an embedded RISC controller handling communications protocol processing.

Logically, the WAN/trunk card 14 can be thought of as divisible into control and WAN-related functions, with the control section responsible for providing management and maintenance functionality, supporting remote operations such as downloads or out-of-band commands, collecting health and performance statistics for the system and boot functionality, as well as system-level functions. WAN-related functionality is related to aggregating the data traffic from the line card and transferring that data to the network core via a high-speed uplink. In particular, a dual port or quad port T1 line interface unit 42 provides for communication between the portable DSL system and the outside world. Data communication information received from the various line cards and directed to the T1 line interface unit 42 through asynchronous transfer mode (ATM) traffic shaping and policing circuitry 44 and duplex circuitry 46 which is able to interface up to 32 DSL modems.

In addition to the dual or quad port T1 interface, the WAN function is additionally able to support T1 point-to-point services with PPP, multi-link point-to-point protocol (MLPPP) with T1/E1, fractional T1 trunks and at least one 10/100 RJ-45 Ethernet port.

Figure 4A:
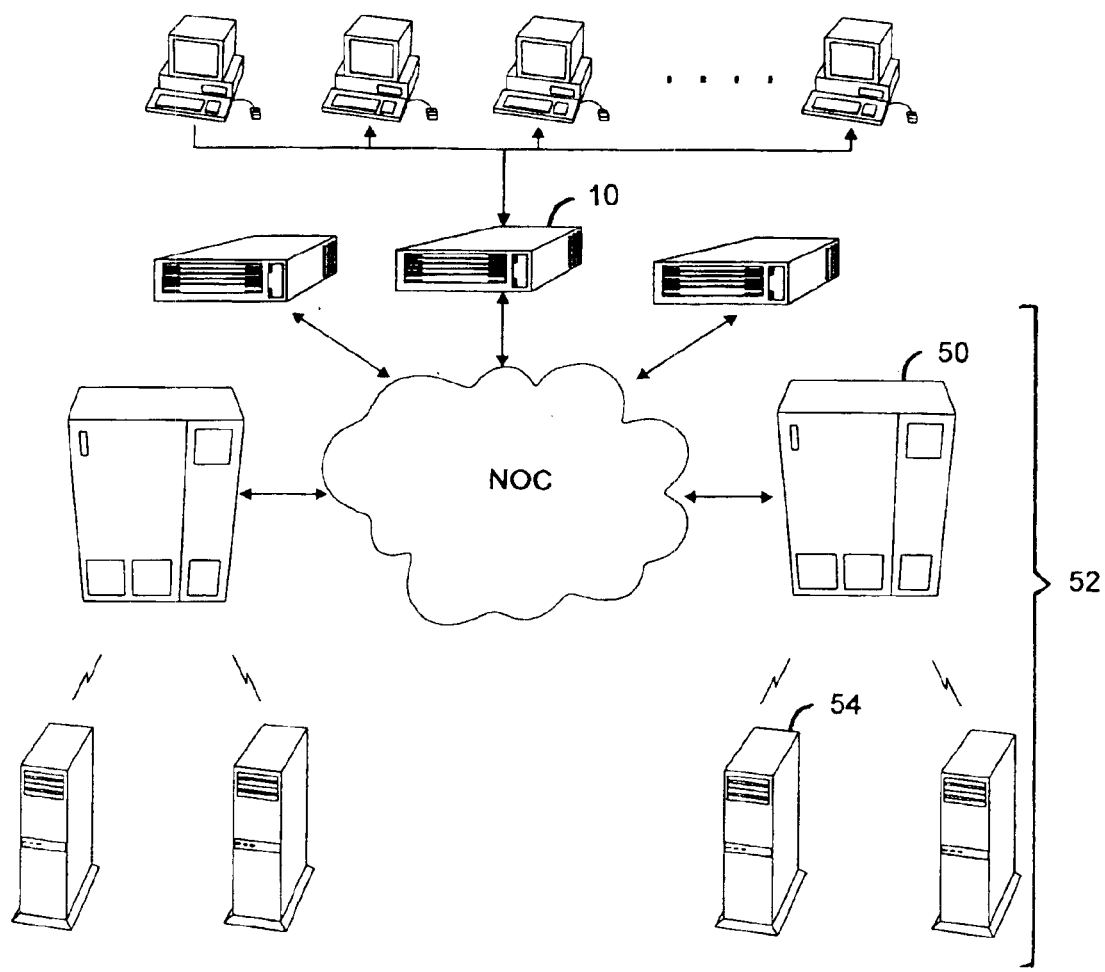
FIG. 4a is a simplified schematic diagram of one embodiment of a NOC constellation configuration according to the present invention.
Figure 4B:
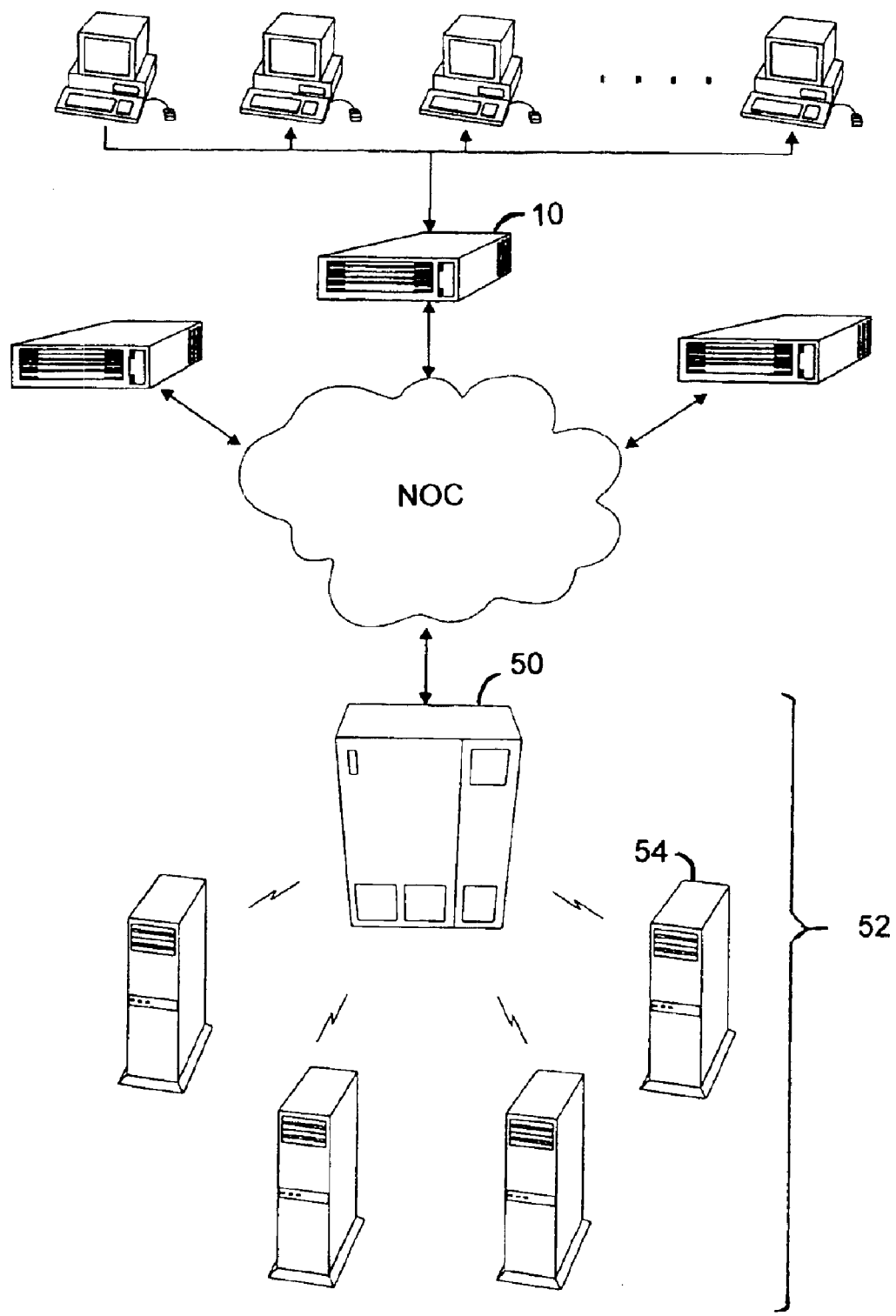
FIG. 4b is a simplified schematic diagram of a second embodiment of a NOC configuration implemented as a single hub.

The system, as implemented in the manner described above, will be understood as being facilitated independently from a local TELCO premises and is further coupled to one or more network server systems, termed herein Broadband Authentication Servers or BASs, in a manner illustrated in the exemplary embodiments of FIGS. 4*a* and 4*b*. In particular, the system is adapted for in-band authentication of user profile information, as well as in-band network management service (NMS) information through a Network Operations Center (or Carrier) commonly known as a NOC. Each Broadband Authentication Server 50 suitably comprises a network server system 52 coupled to a data repository 54 that might be implemented by any form of mass storage media, such as a large-capacity hard disk drive, RAID array, CD ROM bank, or the like. The BAS might be implemented as a single BAS node which services the entire United States region, or might be implemented as a multiplicity of BASs, with each BAS functioning as the operation center for a particular region of the United States. For example, in the conventional GSM case, there are four regional centers for GSM subscription information, a western regional center, an eastern regional center, a southern regional center and a midwestern regional center. Each of the operation centers suitably includes its own, local data repository which hosts all of the user profile data for all users in that particular geographic region of the country.

Similarly, the BAS 50, in accordance with the invention, is able to communicate with DSL service providers (i.e., TELCOs, proprietary DSL carriers, and the like) in each of their respective geographic regions, so as to acquire and maintain user profile information in a Home Location Register (HLR) comprising each BAS' data repository 54. In a multiple BAS configuration, the BASs are arranged as a constellation, with all of the network servers coupled together, so as to be able to communicate with the others, thereby providing each system with access to the entire aggregate data base comprising all of the BAS data repositories and the HLRs of their regional subscribers.

Figure 5:
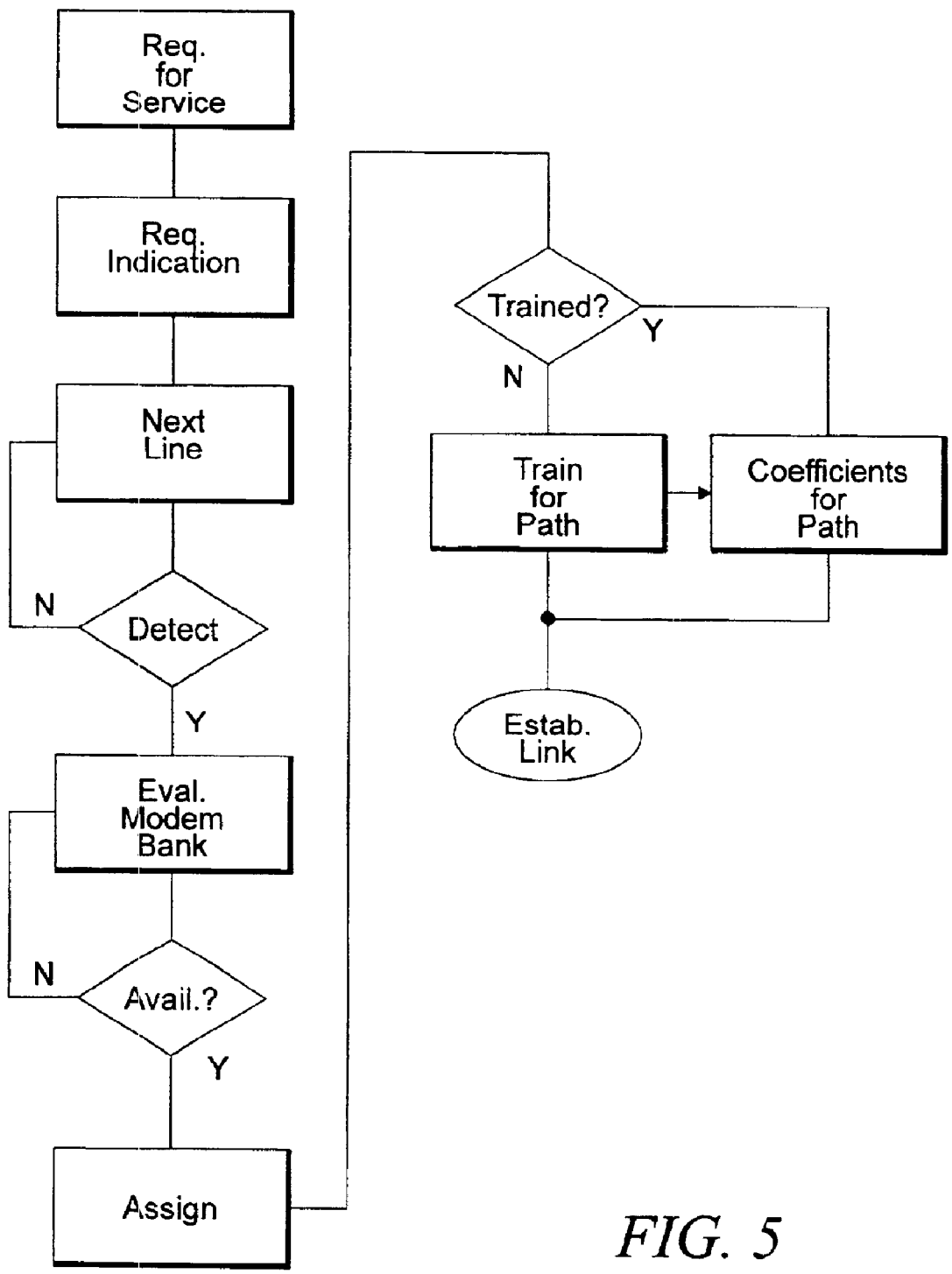
FIG. 5 is an exemplary flow diagram illustrating the connection operations undertaken by a PDSL system effect communication with a user.

In operation, and as illustrated in the exemplary flow diagram of FIG. 5, the portable DSL system is facilitated within a user premises, and the premises TELCO wiring is coupled into the system at the backbone. The system thereby provides portable broadband access to each of the RJ-11 ports that might comprise the user premises. All a user need do is couple a computer (whether desktop, laptop, or other palm or hand-held type system) to the RJ-11 port, and have a current DSL access account, in order to utilize the system for broadband access. As the user wishes to obtain broadband access, their personal line card gives an off-hook indication to their subscriber loop line which is, in turn, detected by detection circuitry of the portable DSL system. Each line card's DSP/microprocessor continually polls its corresponding detectors, in sequence, in order to determine if any requests for data service are outstanding. Upon notification of a data request, the DSP/microprocessor evaluates the availability of the modem bank in order to determine if there are any modems available to service the data request.

A currently available modem is assigned to service the particular subscriber loop and is coupled to the subscriber loop through a corresponding switch matrix. Assuming that this is the first connection between a particular user on that subscriber loop and the system, the system initiates a training sequence between the assigned DSL modem and the corresponding user modem. Transceiver training is a well-understood conventional activity, and is often required in order to minimize the effects of various perturbations introduced into transmitted signals due to line conditions, user transceiver characteristics and the like. Modem training results in an equalizer coefficient set for that particular DSL modem, when communicating with that particular user plant over that particular subscriber line. In practice with principles of the invention, training coefficients for each modem/ user/line combination are maintained in system memory of the BCA unit in order that they may be retrieved during the user's next session, so as to more quickly and efficiently achieve connection stability. Similarly, the identity of the particular BCA modem used to communicate with that particular subscriber line is recorded and the combination data also stored in local memory by the system. In this manner, if that particular modem is available upon the next user session request, that modem is assigned to that user and the appropriate coefficient set, determined by prior training, is extracted from memory and applied to the combination.

Figure 6:
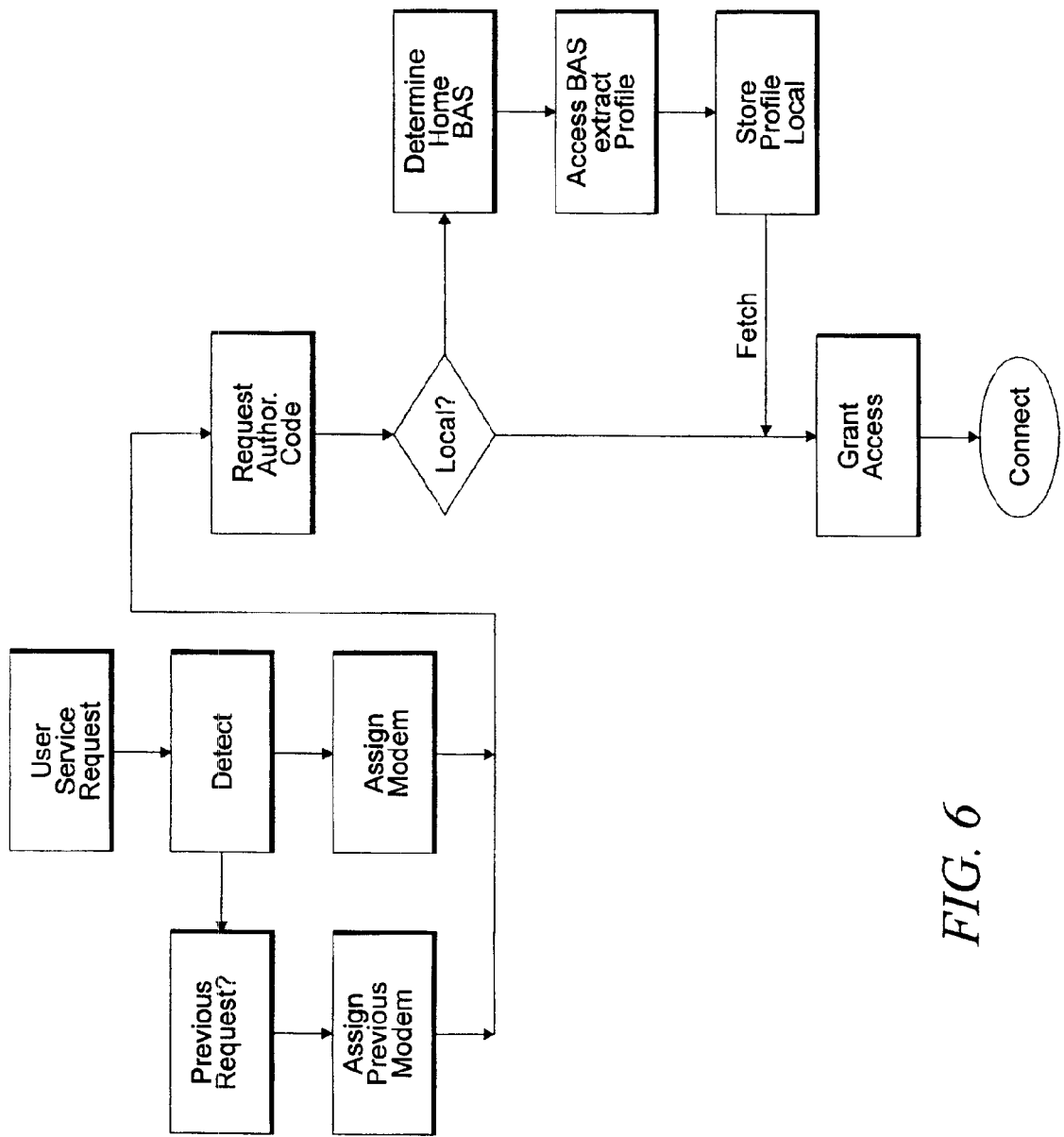
FIG. 6 is an exemplary flow diagram illustrating a user authentication/authorization procedure, in accordance with the invention.

After communication has been established, between the system and the user, the system determines whether the user has been authorized to acquire DSL access, by having a DSL account through their local DSL service provider for example, in accordance with the exemplary flow diagram of FIG. 6. If the user is an authorized DSL customer and, therefore an authorized DSL roaming subscriber, their particular user profile information will have been forwarded by their service provider to the BAS server which services that particular geographic region, and will be maintained in a home location register (HLR) supported by that local BAS. Each local BAS is coupled to receive profile data from the various TELCO and service provider organizations located within their regional geographic area. As an entity adds subscribers, subscriber data is routinely forwarded to the local (regional) BAS for maintenance in the local (regional) data repository.

The portable DSL system, through an interface software routine, presents the user with an authorization request screen which requests the user to enter their personal subscription/authorization information. The interface software routine might be implemented as a simple GUI interface which issues a prompt and expects to receive a response through a text box, for example. Upon receipt of the user's response, the portable DSL system sends an encrypted code word to the corresponding BAS server, based on the subscriber's user ID, which causes the corresponding BAS server to search its data repository for that user's corresponding profile/subscription information. Upon an affirmative reply, the local (regional) server forwards an affirmation to the subject BCA which in turn, initiates a communication session. In accordance with the invention, affirmation information is in the form of information contained within that subscriber's profile hosted in the HLR of the home BAS.

Further, and in accordance with the invention, authorization information, including any bandwidth or other service constraints, for that particular user, is maintained in local memory on the subject BCA unit for future reference and use with respect to that particular user, with the BCA memory space now functioning as a Visitor Location Register (VLR). Cached user profile information (the VLR data) is maintained by the BCA against subsequent requests for communication sessions by the user, with each subsequent communication session request resetting a time-out timer. In order to avoid choking the cache, a time-out timer arbitrarily erases cache entries after a suitable period of time has passed, indicating that the particular user at issue is no longer coupled to that particular subscriber loop and the system need not maintain their characteristic data in VLR. This frees valuable cache real estate for subsequent users and is particularly important in a high turn-over environment, such as a hotel or convention center.

This interface reads the service profile from the local cache database of user profiles. It then authenticates the user using this service profile. A success will be returned if subscriber profile is found available. A failure response will be returned in case user profile is not found in the cache. In case of failure authentication request will be handled by the remote user authentication interface.

In particular, a local user authorization interface reads the service profile from the local cache database (VLR) of user profiles. If the service profile is present, the interface routine then authorizes the user using this service profile. This interface checks the permission for the service usage and return a success if the user is allowed to use the service.

A remote user authentication interface routine is utilized in case the local user authentication interface fails to authenticate the user. An authentication request will be generated and will be sent to the geographically "local" authentication server, based on the unique user ID. The authentication request shall consist of a user ID that can be mapped to next logical authentication server across the country, such that if a user ID is not recognized in the local BAS' HLR the geographically "local" authentication server shall search the next logical authentication server that is mapped to the user ID, instead of broadcasting the user ID across the constellation of authentication servers throughout the country. The remote user authentication interface returns a success upon receiving a success message from any of the authentication servers which were found to recognize the user ID. The authentication server replies with success only when the user profile and the user's service usage permission both are present.

In summary, The BCA, in accordance with the invention, is implemented with scalable architectures to provide broadband connectivity in multiple access locations such as hotels, airports, business centers, etc . . . at DSL data rates. The novel BCA unit utilizes Asymmetric Digital Subscriber Line (ADSL), a modem technology, which converts existing twisted-pair telephone (POTS) lines in to access paths for multimedia and high-speed data communications. The BCA is mainly comprised of a Control/WAN card and multiple Line cards, with the Control/WAN card performing health status, monitoring and NMS functions as well as providing WAN up-link for the aggregated user data received from the line cards.

Each ATM-enabled ADSL line card is constructed to incorporate a combination of sixteen ADSL modem circuits, with each line card handling the subscriber data from 128 POTS lines through a microprocessor controlled Switch Matrix. Each of the subscriber data lines coupled to each line card is associated with a corresponding detector which operates, under microprocessor control, to detect a request for service on the associated receive data pair.

Once a request for service is detected, the system captures the user profile on that associated data line and informs the control processor that a request for service has occurred. A central control processor then ascertains which xDSL modem, in the modem pool, is to be assigned to that particular data line. The processor spawns a request to an external authentication server in order to validate the user profile and grant access to the service being requested. Upon receipt of authentication, the processor assigns an xDSL modem, from the modem pool, to the requesting data line using a switching matrix to connect the corresponding receive data pairs and transmit pairs. The novel BCA unit then multiplexes the modem digital outputs into a multiplexed digital line for delivery to the NOC, or the local service provider.

To summarize, the system according to the invention is configured as a DSL location POP which is completely self contained and which suitably comprises a broadband communication appliance (BCA) situated in the wiring closet of a premises location. The system is completely agnostic with respect to the up-link transfer medium, and may couple to any form of communication exchange through any form of media (optical fiber, copper, wireless, etc.).

The system allows a user to access a WAN through their personal DSL modem, without regard to the user's location, by obtaining the user's authorization access information and personal access profile data from the user's home BAS, and granting DSL access in accordance therewith. Alternatively, if the premises (i.e., a hotel for example) has its own access, the user might avail themselves of one of the premises' modems, in which case the system need not interrogate the user's home BAS; the system maintains the premises authorization and profile data in internal memory and merely fetches and utilizes that information.

What is claimed is:

1. A self-contained data communication system of the type providing simultaneous broadband connectivity to multiple access locations at DSL rates, the system configured for installation in a user premises having multiple subscriber access location ports, the system comprising:

a multiplicity of subscriber data signal lines, each subscriber line coupled between the system and a subscriber port of a user premises;

a plurality of line cards, disposed within a housing, each line card further including;
a DSL modem bank; and
detector circuitry coupled between the modem bank and the multiplicity of subscriber signal lines, the detector circuitry polling the signal lines to thereby detect a request for data service;

a control processor, the processor assigning a particular one of the DSL modems comprising the modem bank to a subscriber upon detection of a request for data service on a particular subscriber signal line;

a WAN/trunk card, disposed within the housing and coupled to the plurality of line cards by a signal bus, the WAN/trunk card connected between each modem bank and a wide area network so as to effect bi-directional broadband communication therebetween;

in-band authentication means for communicating with a remote record storage facility;

a memory storage area configured to receive and maintain subscriber record information provided by the remote record storage facility; and wherein access to a broadband connection to the wide area network is granted in accordance with subscriber record information maintained in the memory storage area; and wherein the remote record storage facility comprises a plurality of authentication servers, each authentication server disposed within and servicing a particular geographic area, each authentication server receiving individual subscriber profile information from DSL service providers within the geographic region and storing said individual subscriber profile information in a respective database.

2. The system according to claim 1, wherein each line card includes sixteen DSL modems, each line card further configured to couple to 128 subscriber signal lines through high density connectors, each line card controlling access to particular ones of the modems by all 128 subscriber signal lines.

3. The system according to claim 2, wherein each housing is configured to include four line cards, the system configured to provide simultaneous access by sixty four DSL modems to a wide area network, each housing defined system providing broadband connectivity to 512 subscriber signal lines.

4. The system according to claim 1, each subscriber receiving a unique subscriber identification indicia, the subscriber identification indicia including an address identifier portion indicating a subscriber's home authentication server.

5. The system according to claim 4, the system interrogating a subscriber's home authentication server in accordance with the subscriber identification indicia, the authentication server returning an authorized subscribers individual subscriber profile information, the system granting broadband access to the wide area network to the subscriber solely in accordance with the individual subscriber profile information.

6. The system according to claim 5, wherein the system stores individual subscriber profile information in the memory storage area, the system granting a subscriber broadband access in accordance with stored individual subscriber profile information upon second and subsequent connection sessions.

7. The system according to claim 1, wherein the WAN/trunk card further comprises:

a WAN connection portion;
a control portion, the control portion further including;
a control processor; and
out-of-band communication means, the out-of-band communication means bi-directionally communicating with a network management system; and
wherein the control portion is functionally bifurcated from the WAN portion, such that the WAN portion may be implemented in accordance with a multiplicity of communication interface methodologies interchangeably.

8. A method for providing simultaneous broadband connectivity to multiple access locations implemented in a premises remote from a user's home service location, the method comprising the steps of:

aggregating a multiplicity of subscriber data lines;
polling the data lines so as to detect a request for data service on particular ones thereof;

servicing multiple simultaneous data service requests through a plurality of DSL modems;

concentrating multiple DSL communication sessions through a wide area network interface so as to facilitate multiple simultaneous communication sessions between a wide area network and multiple users using broadband access from a premises remote from and unrelated to a user's home location;

interrogating a user for an identification indicia upon receipt of a data service request;

establishing an in-band communication channel with a remote record storage facility;

receiving subscriber record information, associated with the user, provided by the remote record storage facility; and granting access to a broadband connection to the wide area network in accordance with the subscriber record information;

wherein the remote record storage facility comprises a plurality of authentication servers, each authentication server disposed within and servicing a particular geographic area, each authentication server receiving individual subscriber profile information from DSL service providers within the geographic region and storing said individual subscriber profile information in a respective database.

9. The method according to claim 8, each subscriber receiving a unique subscriber identification indicia, the subscriber identification indicia including an address identifier portion indicating a subscriber's home authentication server.

10. The method according to claim 9, the system interrogating a subscriber's home authentication server in accordance with the subscriber identification indicia, the authentication server returning an authorized subscriber's individual subscriber profile information, the system granting broadband access to the wide area network to the subscriber solely in accordance with the individual subscriber profile information.

11. The system according to claim 10, further comprising:
storing individual subscriber profile information in a local memory storage area; and
granting a subscriber broadband access in accordance with stored individual subscriber profile information upon second and subsequent connection sessions.

12. A method for authenticating simultaneous broadband connectivity requests by a plurality of users coupled to multiple access locations implemented in a premises remote from a user's home service location, the method comprising:
assigning each subscribing user a unique identification indicia;
associating the identification indicia with the user's subscription profile information;
storing the user's subscription profile information in a database hosted by one of a plurality of authentication server systems, each authentication server disposed within and servicing a particular geographic area, each authentication server receiving individual subscription profile information from DSL service providers within the geographic region;
interrogating a user for their identification indicia upon receipt of a data service request;
establishing a communication channel with the authentication server;
receiving a user's subscription profile information from the authentication server; and
granting access to a broadband connection to a wide area network in accordance with the user's subscription profile information.

13. The method according to claim 12, each subscriber identification indicia including an address identifier portion indicating a subscriber's home authentication server.

14. The method according to claim 13, further comprising:
storing individual subscriber profile information in a local memory storage area; and
granting a subscriber broadband access in accordance with stored individual subscriber profile information upon second and subsequent connection sessions.

* * * * *